United States Patent [19]

Beck

[11] B 4,001,037
[45] Jan. 4, 1977

[54] LEAD BATTERIES

[75] Inventor: Fritz Beck, Ludwigshafen, Germany

[73] Assignee: Badische Anilin- & Soda-Fabrik Aktiengesellschaft, Ludwigshafen (Rhine), Germany

[22] Filed: Oct. 3, 1974

[21] Appl. No.: 511,665

[44] Published under the second Trial Voluntary Protest Program on March 2, 1976 as document No. B 511,665.

Related U.S. Application Data

[63] Continuation of Ser. No. 285,248, Aug. 31, 1972, abandoned.

[30] Foreign Application Priority Data

Sept. 3, 1971  Germany .......................... 2144198

[52] U.S. Cl. .............................. 429/188; 429/200; 429/228
[51] Int. Cl.² ........................................ H01M 4/36
[58] Field of Search ................. 136/26, 27, 36, 10, 136/120, 154, 155

[56] References Cited

UNITED STATES PATENTS

| | | | |
|---|---|---|---|
| 1,425,163 | 8/1922 | Bardt | 136/26 |
| 2,737,541 | 3/1956 | Coolidge | 136/26 X |
| 3,481,790 | 12/1969 | Duddy | 136/26 X |
| 3,484,290 | 12/1969 | Knight | 136/10 X |
| 3,486,940 | 12/1969 | Ruben | 136/26 |
| 3,576,674 | 4/1971 | Ruben | 136/26 |
| 3,615,831 | 10/1971 | Ruben | 136/26 |
| 3,629,007 | 12/1971 | Kilduff | 136/120 R X |
| 3,870,563 | 3/1975 | Ruben | 136/26 |

Primary Examiner—John H. Mack
Assistant Examiner—C. F. LeFevour
Attorney, Agent, or Firm—Johnston, Keil, Thompson & Shurtleff

[57] ABSTRACT

Lead batteries which contain lead salt solutions and/or their corresponding acids and have a titanium base plate on the positive electrode and a graphite base plate on the negative electrode.

3 Claims, 5 Drawing Figures

LEAD BATTERIES

This is a continuation of application Ser. No. 285,248, filed Aug. 31, 1972 now abandoned.

Fore more than a hundred years lead batteries have been widely used for storing electrical energy. The active materials are lead on the negative plate and lead dioxide on the positive plate. From 20 to 30% by weight sulfuric acid serves as the electrolyte. Sparingly soluble lead sulfate formed during discharge remains on the surface of the plates. Since, in contrast to lead and lead dioxide, lead sulfate does not conduct current, the active material can never be completely exhausted. The industrial development of the lead battery is therefore characterized by numerous attempts to improve the efficiency for example by the introduction of porous and sintered electrodes which naturally involves many problems in respect of the stability of the plates. Owing to drastic changes in volume during charging and discharging operations (the densities are: Pb = 11.4, $PbO_2$ = 9.5, $PbSO_4$ = 6.2) the electrodes tend to crumble and disintegrate. According to Ullmann, 3rd edition, volume 7, page 773, even today the efficiency does not exceed 50% in the best cells. Another disadvantage is that at high current densities the electrolyte in the pores is depleted so that a considerable concentration overvoltage builds up.

While the lead battery in general use is more accurately described as a lead sulfate battery in which the empirical reaction:

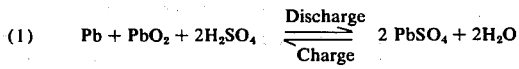

(1) $\quad Pb + PbO_2 + 2H_2SO_4 \underset{\text{Charge}}{\overset{\text{Discharge}}{\rightleftharpoons}} 2\,PbSO_4 + 2H_2O$ proceeds, the proposal has also been made to use a soluble lead salt, particularly lead perchlorate, instead of sulfuric acid as the electrolyte in lead batteries (U.S. Pat. No. 1,425,163). A similar empirical reaction:

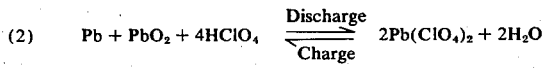

(2) $\quad Pb + PbO_2 + 4HClO_4 \underset{\text{Charge}}{\overset{\text{Discharge}}{\rightleftharpoons}} 2Pb(ClO_4)_2 + 2H_2O$ takes place in this "lead perchlorate cell," but the lead salt formed during discharge has good solubility in water. This means that the active material can be utilized practically quantitatively during discharge, it is so to speak removed layer by layer during discharge and built up again during charging. The theoretical energy storage density is 167 Wh/kg in the case of the lead sulfate battery, whereas in practice, mainly because of poor utilization of the active material, scarcely more than 30 Wh/kg is obtained. Of course the theoretical value includes only the active material and the 100% acid, whereas in the practical value the weight also includes the base plates, the water in the dilute acid, the cell case, the terminals, etc.

On the other hand the theoretical energy density in the case of lead perchlorate cells is only 111 Wh/kg because of the double equivalent weight of perchloric acid and the lower voltage. Of course the active material may be completely utilized and the acid concentration may be increased to 50% or even more so that practical energy densities of up to 50 Wh/kg should be achievable, i.e. considerably more than the values at present realisable in the case of lead sulfate cells.

A serious problem in connection with the lead perchlorate cell is the question of a suitable base plate for the layers of Pb and $PbO_3$ which form on the plates during charging. The material should be of good conductivity and should not dissolve in acid. For these reasons lead is excluded, at least for the positive electrodes, because it cannot be passivated in perchloric acid. The following have been proposed as base plate materials:

1. Ferrosilicon for the negative electrodes (U.S. Pat. No. 1,425,163).
2. Graphite or graphite-filled phenol-formaldehyde resin for the positive electrode and copper for the negative electrode (U.K. Pat. No. 449,893).
3. In a work by Schrodt, Otting, Schoegler and Craig (Trans. Electrochem. Soc., 90, 405 (1946)) on primary cells with $Pb/PbO_2$ electrodes and soluble lead salts, base metals which are passivated in acid electrolytes, particularly nickel, are proposed as base plates for the positive electrode.

The plate materials hitherto proposed are not all suitable to the same extent for a lead perchlorate battery. The usefulness of ferrosilicon and nickel is subject to certain reservations because upon prolonged use contamination of the electrolytes with iron or nickel cannot be avoided and this results in serious disturbances at the lead electrodes by lowering the hydrogen overvoltage. Graphite or graphite-filled polymers are not very suitable for positive electrodes because upon repeated charging and discharging the material swells increasingly and the lead dioxide layers drop off.

It is an object of the present invention to provide electrodes for lead batteries which contain lead salt solutions and/or their corresponding acids, exhibit improved conductivity, do not contaminate the electrolyte, and even after repeated charging and discharging undergo no changes in shape.

I have found that these objects are achieved when the positive base plates are made of titanium and the negative base plates are made of graphite or of graphite powder embedded in a binder which is stable to the electrolyte.

To obtain particularly adherent layers of lead dioxide on the titanium plates the surface of the titanium may be mechanically roughened or degreased by conventional methods. It is also possible by an oxidative treatment in the presence of compounds of metals of subgroups 1, 6, 7 and 8 of the Periodic Table and of aluminum, vanadium and bismuth to produce a layer of titanium dioxide provided with the oxides of the said metals onto which can be deposited the layers of lead dioxide which adhere firmly during charging.

Graphite or graphite-filled plastics based on polyolefins, fluorinated or chlorinated polyolefins, polystyrene, polyamides, polyesters or crosslinked polycondensation products of a graphite content of from 30 to 85% by weight and a particle size of from 5 to 500 microns are very good as plates for the deposition of lead on the negative side. Obviously a dispersion of finely divided graphite in a suitable binder, for example based on an acrylate or epoxide, can be applied to a suitable substrate, for example of chromium-nickel steel, nickel or copper and the dispersion dried and hardened after application to the substrate. Completely uniform layers of lead are obtained which are dendrite-free, have a matt surface and adhere well to the substrate.

The electrolyte contains the free acid in the charged condition and concentrated solutions of the corresponding lead salt with a little free acid in the discharged condition. Suitable acids include particularly perchloric, tetrafluoboric, fluosilicic and sulfamic acid which are electrochemically stable under the charging and discharging conditions. Nitric acid is not so suitable because it is partially reduced at the cathode inter alia to nitrous acid which attacks the $PbO_2$. The high electrolyte concentrations present at any state of charge mean that the freezing point is very low. Batteries of the invention may be used without precautions at temperatures in the range from −50°C to +70°C, unlike lead sulfate cells which fail at only −15°C. The current densities calculated per apparent area are for example in the case of a lead perchlorate cell considerably higher (1 to 50 millamps/cm$^2$) than in the case of the lead sulfate cell. The reason for this behavior is to be seen in both cases in the absence of a porous system.

The cell may however be constructed in the form of a bipolar cell. In this case the bipolar electrodes may be made very thin because they only have to conduct current perpendicular to the surface. Since the base plates consist of a material which is stable to the electrolyte, destruction by chemical or electrochemical attack is not possible. With lead as the material for the plates this principle is not realizable. Titanium is a very tough metal so that even in the case of very thin sheeting, large areas can be designed to be selfsupporting, even in the coated condition. If necessary, support may be provided by wide-meshed plastics separators between the electrodes. A bipolar unit may for example consist advantageously of a titanium foil having a thickness of from 0.02 to 0.2 mm on whose cathode side a graphite-filled plastics sheet is pressed or stuck by means of a graphite-filled adhesive. By means of these very thin partitions it is possible to achieve favorable energy densities which considerably surpass values hitherto achieved in the case of lead cells.

Figure 1:
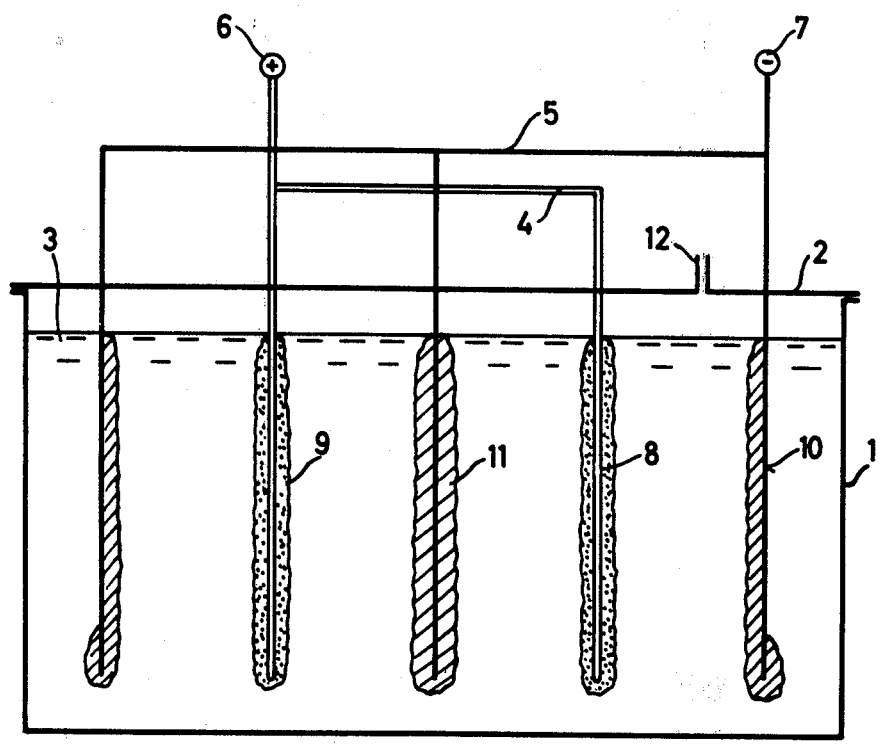
FIG. 1 shows a conventional unipolar cell.
Figure 2A:
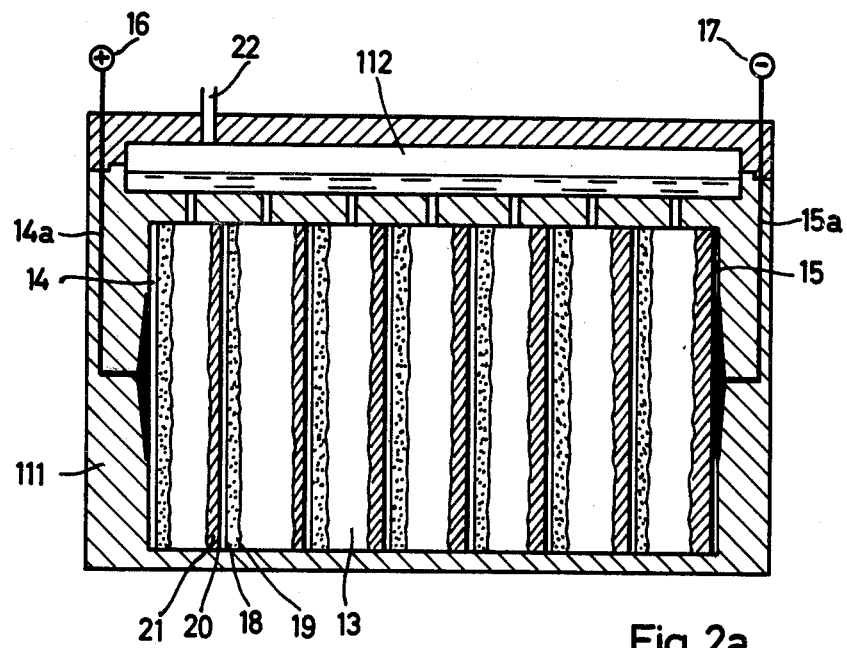
FIGS. 2a and 2b shows a bipolar arrangement.
As regards the construction of the cell, a conventional unipolar arrangement may be chosen (FIG. 1). The cell comprises a case 1 having a cover 2 and is filled with electrolyte 3. The positive electrodes are connected by contact bridge 4 and the negative electrodes are connected by contact bridge 5 and terminate in pole terminals 6 and 7. The positive electrodes consist of base plates 8 of titanium and a layer of lead dioxide 9 deposited thereon, while the negative electrodes consist of a base plate of graphite or graphite-filled plastics 10 having a layer of lead 11 deposited thereon. 12 is a venting and filling pipe. In this arrangement the base plates have to be fairly thick, for example from 2 to 10 mm, to provide satisfactory current distribution.
Figure 2B:
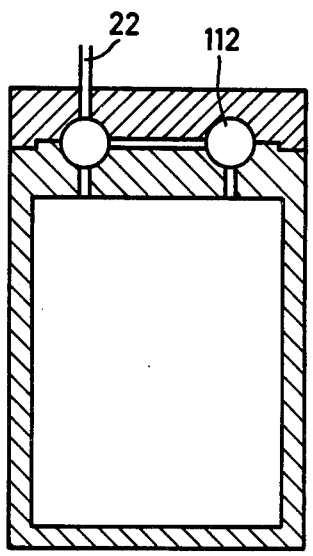

FIGS. 2a and 2b illustrate a bipolar arrangement with vertical electrodes. The casing 111 has in the lid a recess 112 which serves as an expansion and venting zone. The spaces between the bipolar electrodes 18 to 21 are filled with electrolyte 13. End plates 14 and 15 are connected by means of conductors 14a and 15a to terminals 16 and 17. The bipolar electrodes are constructed as follows:

The positive plates of titanium 18 and the negative plates 20 of graphite or graphite-filled plastics are in electrical connection on their rear sides. One front face of this arrangement bears a layer of lead dioxide (19) and the other a layer of lead 21. A port 22 makes it possible to fill and vent the battery.

Figure 3A:
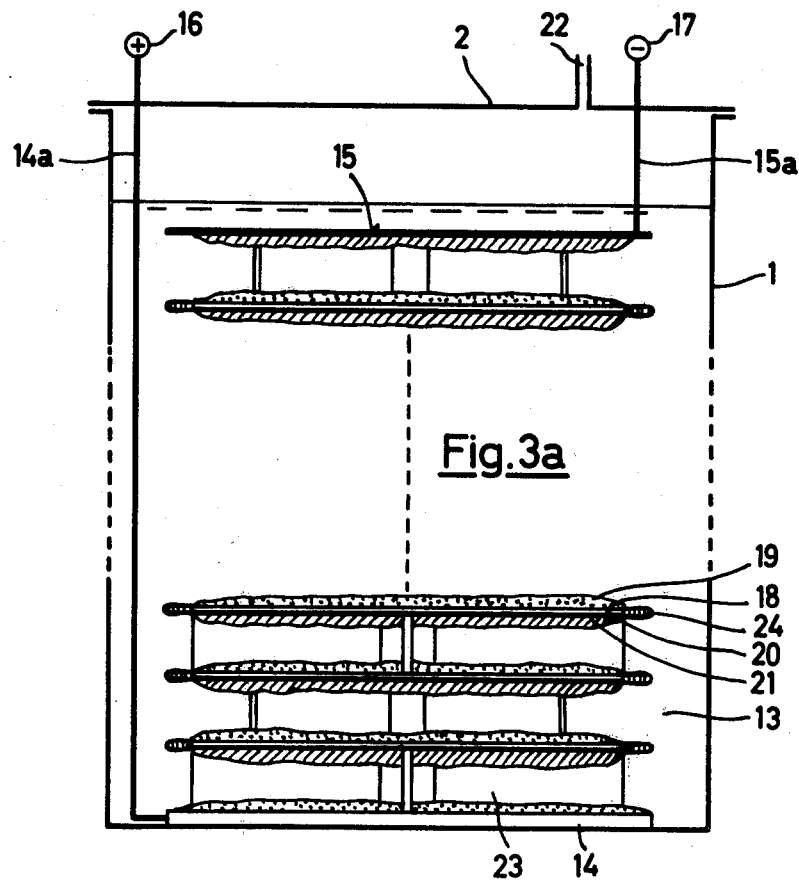
Figure 3B:
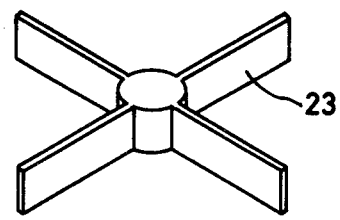

A bipolar cell having horizontal electrodes is shown in FIGS. 3a and 3b. Parts in these FIGS. which correspond to parts illustrated in FIG. 2 have the same reference numerals. In this case the sealing problems are considerably easier to solve. 23 is a spacer made of plastics, and 24 is a pressed-on ring of plastics which serves to prolong the path of the electrolyte to the superjacent bipolar electrode.

The Examples illustrate the invention.

EXAMPLE 1

A cell is composed of a positive electrode consisting of a 1-mm titanium sheet which is seeded with magnetite and provided with a 20-micron layer of lead dioxide on one side from a lead nitrate solution, and a negative electrode consisting of a plate of synthetic graphite having a thickness of 3 mm. Between the electrodes there is a frame of polished polymethyl methacrylate having a thickness of 5 mm which leaves open a rectangular useful electrode surface of 14.5 cm$^2$. Two openings for filling and venting are provided at the upper small side of the frame. The backs of the electrodes are in contact with brass plates by which the entire arrangement is held together.

At the commencement of the experiment 15.3 g of a mixture of 65% by weight of lead perchlorate, 32% by weight of water and 3% by weight of perchloric acid is filled into the cell. The useful surface area of the electrodes is completely covered by the electrolyte. The cell is charged with 145 milliamps, equivalent to a current density of 10 milliamps/cm$^2$. The potential is 1.96 volts at the beginning, 1.99 volts after one hour, 2.02 volts after two hours, 2.05 volts after three hours and at the end (after 3.8 hours) 2.10 volts. At this point the electrolyte has the approximate composition: 10% by weight of lead perchlorate, 45% by weight of HClO$_4$ and 45% by weight of H$_2$O. The change in volume is quite small because the higher density of the active material is compensated by the lower density of the electrolyte in the final condition. No gas bubbles are formed at the negative plate and only quite a few gas bubbles at the positive plate during charging. The layer of lead is smooth, devoid of dendrite and adheres well. The lead dioxide layer also adheres well.

After standing for twenty-four hours at room temperature (the cell potential changes from 1.88 to 1.84 volts) discharge is begun at 145 milliamps = 10 milliamps/cm$^2$. The initial voltage is 1.68, after 1 hour 1.62, after 2 hours 1.56 and after three hours 1.51 volts. After 3.2 hours the discharge is stopped because the potential has fallen below 1 volt. An energy weight ratio of 33 watthours/kg is calculated with reference to the weight of the electrolyte and the utilizable basic electrodes. After passing through a cycle of twenty chargings and dischargings no significant change could be found in the current voltage data found at first.

EXAMPLE 2

A cell having bipolar electrodes of the type according to FIG. 2 consists of:
1. Two end plates of graphite seeded with magnetite and coated with 20 microns of PbO$_2$ as in Example 1;

2. Nine bipolar electrodes of titanium sheeting having a thickness of 0.05 mm onto which a polypropylene sheeting filled with 70% by weight of graphite and having a thickness of 0.15 mm has been stuck by means of a graphite filled epoxide adhesive.

The graphite side is roughened, and the titanium side is seeded with graphite and provided with a 20-micron lead dioxide layer from a lead nitrate solution. The electrodes are stuck in grooves in a polyethylene case at a distance of 5 mm from one another so that a free area of exactly 1 dm$^2$ is formed. A solution of 70% by weight of lead perchlorate and 3% by weight of perchloric acid is then introduced so that the electrodes are just completely submerged. Charging is at the rate of 1 amp. Charging is stopped after 4.5 hours.

After one day, the cell is discharged at 1 amp. The potential falls from 17.0 volts to 15.2 volts during 3.6 hours and then rapidly to lower than 10 volts. A total of 57.5 watt-hours is taken from the battery. The weight of the cell is made up as follows:

| | |
|---|---|
| electrolyte | 1100 g |
| two end plates | 45 g |
| nine bipolar plates | 50 g |
| cells | 240 g |
| terminals, leads to end plates | 50 g |
| | 1385 g |

There is therefore an energy storage density of 41.5 Wh/kg.

I claim:

1. A lead battery which can be alternately charged and discharged which comprises: a.) an electrolyte selected from the group consisting of perchloric acid, tetrafluoboric acid, fluosilicic acid and sulfamic acid and their corresponding lead salts; b.) a positive lead oxide electrode having a base plate made of titanium; and, c.) a negative lead electrode having a base plate made of graphite or of a graphite powder embedded in a binder which is stable to the electrolyte.

2. A lead battery as set forth in claim 1 wherein the negative base plate is made from a plastics filled to the extent of from 30 to 85% by weight with particles of graphite having a particle size from 5 to 500 microns.

3. A lead battery as set forth in claim 1 comprising bipolar units each consisting of titanium sheeting having pressed or stuck onto its cathode side a graphite-filled plastics sheeting.

* * * * *